United States Patent [19]

Lin

[11] 4,202,472
[45] May 13, 1980

[54] DISPENSER FOR INSECTICIDE OR THE LIKE

[76] Inventor: Feng Lin, 455 Ocean Ave., Brooklyn, N.Y. 11226

[21] Appl. No.: 908,823

[22] Filed: May 23, 1978

Related U.S. Application Data

[62] Division of Ser. No. 723,784, Sep. 16, 1976, Pat. No. 4,105,144.

[51] Int. Cl.² .............................................. B65D 47/10
[52] U.S. Cl. .................................. 222/187; 206/205; 206/222; 206/532; 229/56
[58] Field of Search .............. 206/532, 205, 823, 222, 206/605, 534.1, 534.2; 229/56, 55; 220/87; 222/187, 541

[56] References Cited

U.S. PATENT DOCUMENTS

| 961,692 | 6/1910 | Gilfillan | 229/56 X |
|---|---|---|---|
| 2,255,331 | 9/1941 | Pospisil | 206/532 |
| 2,647,681 | 8/1953 | Paoli | 229/56 |
| 2,721,099 | 10/1955 | Rupp | 220/87 X |
| 2,867,372 | 1/1959 | Fox | 229/56 |
| 2,917,116 | 12/1959 | Wyant | 220/87 X |
| 3,479,802 | 11/1969 | Fesco | 229/56 X |
| 3,519,196 | 7/1970 | Paxton | 229/56 X |
| 3,550,764 | 12/1970 | Tigner | 206/605 X |

FOREIGN PATENT DOCUMENTS

| 1214600 | 4/1966 | Fed. Rep. of Germany | 206/222 |
|---|---|---|---|
| 1134429 | 4/1954 | France | 229/56 |

Primary Examiner—Joseph Man-Fu Moy
Attorney, Agent, or Firm—Hopgood, Calimafde, Kalil, Blaustein & Liberman

[57] ABSTRACT

A device for dispensing materials such as insecticides or repellents within a container includes an elongated enclosed member in which the materials are placed, which is attached to a surface of the container. A pull tab is provided to rupture the enclosed member releasing the materials.

6 Claims, 14 Drawing Figures

U.S. Patent May 13, 1980 Sheet 1 of 3 4,202,472
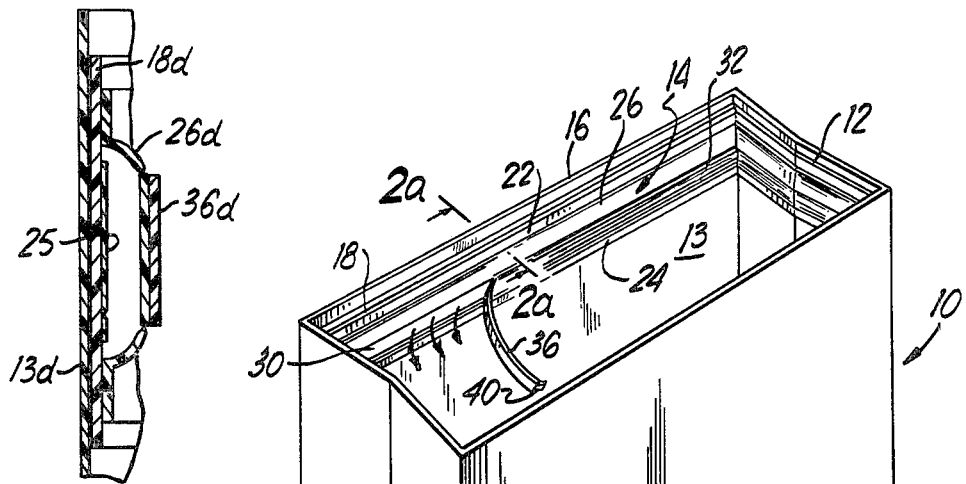
FIG. 1
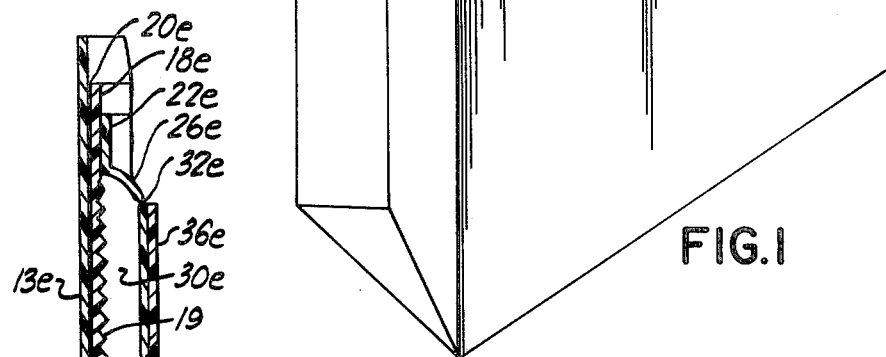
FIG. 2d
FIG. 2e
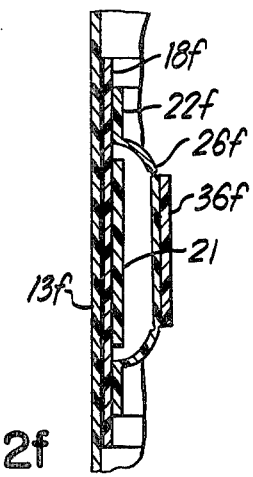
FIG. 2f
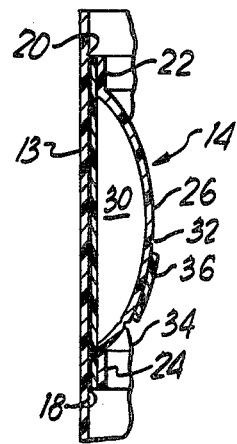
FIG. 2a
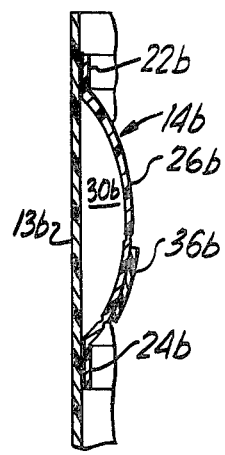
FIG. 2b
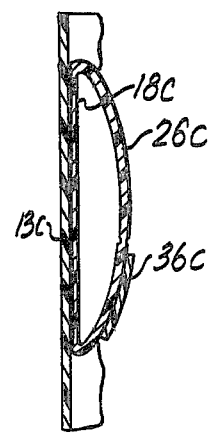
FIG. 2c

DISPENSER FOR INSECTICIDE OR THE LIKE

This is a divisional application of copending application Ser. No. 723,784, filed Sept. 16, 1976, now U.S. Pat. No. 4,105,144.

Background of the Disclosure

Garbage and trash containers are made to dispose of various organic waste material in a sanitary manner. Unless they are properly sealed, they will permit insects or vermin to gain access to their contents. Such containers then provide ideal breeding areas for germ-bearing insects and potentially harmful micro-organisms which can be spread by rodents and other vermin. Because of this, such garbage containers can provide a significant health hazard.

Realisticially, it is impossible to ensure an adequate seal with economically feasible garbage containers. Normally, such containers comprise bags which are secured about their closeable-mouth after filling by an adhesive seal or a tie. Such seals are imperfect at best and often work open when handled, providing easy access for insects and vermin.

One means of greatly lessening or eliminating this health hazard would be to spread substances to repel or kill insects or vermin over the interior walls of the garbage prior to sealing the container and preferably prior to the introduction of waste material into the container. This, however, would require that a source of such substance be kept nearby for ready access. Such substances are dangerous in themselves if kept in kitchen or pantry areas where they can contaminate foods or in any areas where they are accessible to young children. In addition to this problem, there is the practical problem that it is inconvenient to have to purchase such substances separately from garbage containers with which they are to be used. Additionally, the poisons or repellent substances may be used in the containers in excessive amounts causing wastage or insufficient amounts so that they do not accomplish their desired purpose.

Summary of the Invention

A device for dispensing an insecticide, repellent or poisonous substance along a surface of a trash container includes at least one elongated enclosure member attached to the container surface. Mounting means are provided to hold the substance within the enclosure member and opening means are provided to rupture the enclosure member to expose the substance.

Brief Description of the Drawings

FIG. 1 is a prospective view of a container, including a first embodiment of the inventive dispensing device.

FIG. 2a is a cross-sectional view of this dispensing device of FIG. 1 taken along plane 2a.

FIG. 2b is a cross-sectional view of a first alternative mounting arrangement of the dispensing device of FIG. 1.

FIG. 2c is a cross-sectional view of a second alternative mounting arrangement of the dispensing device of FIG. 1.

FIGS. 2d, 2e and 2f are cross-sectional views of three variations of the dispensing device shown in FIG. 2a.

FIG. 3a is a cross-sectional view of the dispensing device of FIG. 3 taken along plane 3a.

FIG. 5a is a cross-sectional view of the dispensing device of FIG. 5 taken along plane 5a.

Description of the Preferred Embodiments

Figure 3:
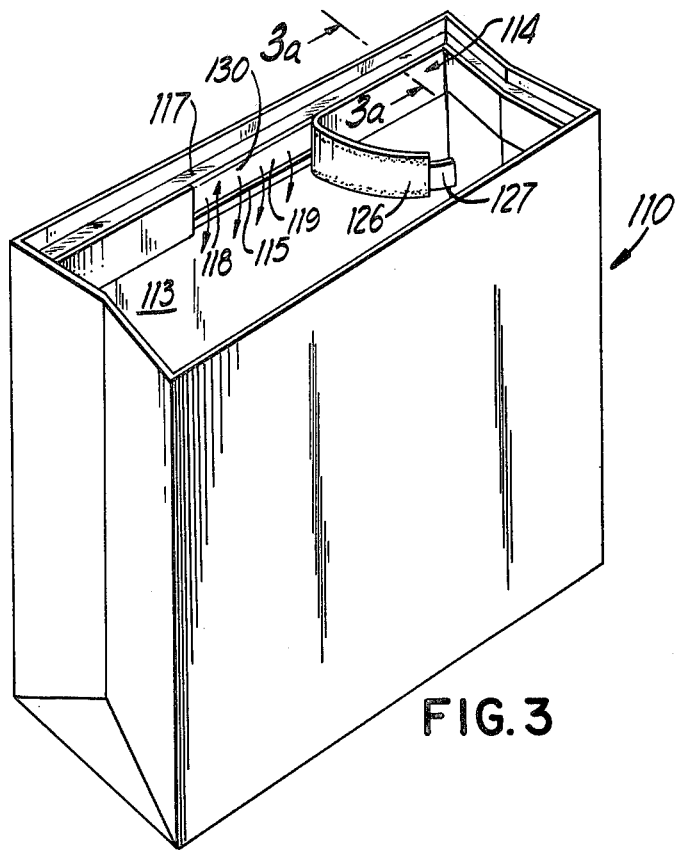
FIG. 3 is a prospective view of a container, including a second embodiment of the inventive dispensing device.

FIG. 1 depicts a garbage bag 10 having an open mouth, portion 12, which is adapted to receive waste materials such as garbage or trash. A tube-like dispensing device 14, is attached to the inner bag wall 13, preferably about the mouth 12 of the container adjacent to the upper edge 16. The dispensing device 14, as shown in greater detail in the cross-sectional view of FIG. 2a, includes a backing plate 18, which is attached to the bag wall 13 by a layer of adhesive 20. A tubular cover member 26, is attached to backing-plate 18 along areas 22 and 24 by a suitable adhesive and extends inwardly in an arched cover 26 between areas 24 and 22 to define an enclosed substantially tubular chamber 30. Cover member 26, includes weakened area such as perforated lines 32 and 34. A tear strip 36 is disposed between these perforated lines. A predetermined amount of insect repellent, insecticide or vermin poison may be mounted within the tubular chamber 30.

Preferably before the bag 10 is filled with trash or garbage or alternatively prior to sealing it, a free-end 40 of the tear strip 36 is grasped and pulled, causing the tubular chamber 30 to break along perforations 32 and 34. The insecticide, insect repellent and/or vermin poison is thereby released and flows downwardly along the inner sides 13 of the container 10, and over any trash or garbage within the container 10. If desired, the amount of material within various parts of cavity 30 can be varied along the length of the cavity 30, such that a proper amount of insecticide, insect repellent and/or vermin poison is released at predetermined longitudinal areas along the dispenser 14. As shown in FIG. 1, the dispenser 14 can extend around the entire periphery of the mouth portion 12, of container 10, or can be located at selected points along the inner bag surface.

The container shown as a bag 10 in the drawings may alternatively be a box or other type of container and may be made of any material, of which containers are usually made such as plastic, cellophane, heavy paper, parchmentized paper or other fibrous material. The dispenser 14 may be made of any nonpermeable, water proof material, which is readily tearable by a tear strip such as 36. Suitable materials for the dispenser 14 include paper foil laminates and synthetic resins. Suitable synthetic resins include polyethylene, polypropylene, polystyrene, polyester, polyvinyl chlorides, cellulose esters and cellulose ethers.

The dispenser 14 may be heat fused to the inner surface of the container if the container and dispenser are made of a suitable heat fusable material, such as polyvinyl chloride. Alternatively, the dispenser 14 may be attached to the inner container surface by an adhesive layer of a suitable adhesive material such as epoxy resins, acrylic resins, vinyl acetate, vinyl acrylic resins and ester resins.

Certain plastic materials such as polyethylene can be formed into suitable bags by the well known "bubble" method in which a tube of polyethylene is expanded by the application of air pressure to form a tubular bubble. After cooling, the extruded bubble is flattened, cut and sealed at appropriate intervals to form individual plastic bags.

Dispensers formed as described above can be applied to the heated exterior of the plastic bubble and will be fused to the exterior of the bubble if a suitable plastic is used for the backing plate 18 of the dispenser. Alternatively, a heat sensitive adhesive may be employed to attach the dispenser to the plastic bubble.

Ideally, the individual dispensers 14 are applied to the plastic bubble at periodic longitudinal intervals of one bag length, such that they will be disposed on the exterior of the finished tube at a point adjacent to the point where the tube will be cut to form the mouth of each finished bag. The finished bags after cutting to form the mouth and fusing to form the bottom can then be turned inside out so that the dispenser 14 is then disposed on the interior wall 13 of the bag 10 at a point adjacent to the mouth 12 as shown in FIG. 1.

The above described method provides an efficient and inexpensive way to attach the dispenser 14 to a plastic bag. It eliminates the extra steps and inconvenience which would be entailed in attaching the dispensers to the interior of the container after manufacture.

The repellent and/or poisonous materials placed in the dispenser 14 may be in the form of a solution, emulsion or powder depending on the circumstances. Materials usable in this application, including pyrethrins, malathion (O,O-dimethyldithiophosphate of diethyl mercaptosuccinate), parathion (O,O-diethyl-O,p-nitrophenyl thiophosphate), and O,O-diathyl O-(2-isopropyl-4-methyl-6-pyrimidinyl)phosphorothioate. A material may be chosen which will flow in its entirety down the walls of the container when the dispenser 14 is ruptured by tear strip 36 or alternatively a more viscous material may be utilized causing at least some of the material to remain in or adjacent to the dispenser after it is ruptured.

Preferably a volatile material is utilized to generate fumes throughout the container to repel or kill vermin seeking entry. Since this material is only released within the container, very little of it will escape to the surrounding room air.

FIG. 2b shows a dispenser 14b, which is exactly the same as that shown in 2a with the exception of backing plate 18. The ends 22b and 24b of cover member 26b, are attached directly to the inner wall 13b of the container 10 so that the tubular chamber 30b is created between cover member 26b and container inner-wall 13b. This design of the dispenser 14b performs substantially as described above, with reference to FIG. 2a.

FIG. 2c shows another variation of the dispenser 14, in which backing plate 18c and cover member 26c are formed from a single flattened tubular body. The flattened portion 18c of that tubular body is attached to the inner bag wall 13c.

FIG. 2d, 2e and 2f show variations of the dispenser 14 shown in FIG. 2a. In the version of FIG. 2e, a roughen surface 19 is provided on the striplike area of backing plate 18e, which is disposed beneath cover member 26e. In the version of FIG. 2f, an additional strip 21 of a porous material is attached to the backing plate 18f, along the area beneath cover member 26f. In the version of 2d, a strip 25 of a suitable repellent and/or poisonous material is coated onto the backing plate 18d in the area beneath the cover member 26d.

When the cover members 26d, 26e and 26f respectively are ruptured by the tear strips 36d, 36e and 36f, some of the repellent and/or poisonous materials will flow out of the dispenser 14 and down the interior wall 13 of the container 10. For some applications, however, it is desirable that a portion of this material be retained at a predetermined area of the interior surface 13, such as adjacent to the mouth 16 of the container 10. The arrangements of FIGS. 2d, 2e and 2f provide a means of maintaining a reservoir of this material in that area. In FIG. 2e, a portion of the repellent and/or poisonous material, if it is chosen so as to have an appropriate viscosity, will adhere to the roughened surface 19. In FIG. 2f, some of the repellent and/or poisonous material, if it is a suitable liquid, will be absorbed into and held by the porous strip 21. In FIG. 2d, the strip 25 provides the requisite reservoir.

The arrangements exemplified by FIGS. 2d, 2e and 2f as variations of FIG. 2a may be applied equally well to make variations in the basic embodiments shown in FIGS. 2b and 2c. They will perform the same way when so applied to provide a reservoir of material on a given area of the interior surface of the container 10.

The use of a roughen surface 19, a porous strip 21 or a coated strip 25 as shown in FIGS. 2e, 2f and 2d respectively, make it possible to utilize two separate types of repellent and/or poisonous materials if desired. One type would be chosen to flow out readily when dispenser 14 is ruptured, while a second type could be chosen to adhere to the roughened surface 19, the porous strip 21 or the coated strip 25.

Figure 3A:
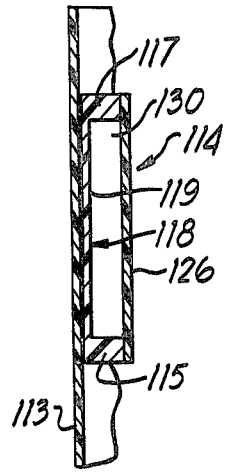

A second embodiment of the inventive dispensing device 114 is shown in FIGS. 3 and 3a. The garbage bag 110, is substantially the same as the bag 10 described in reference to the embodiment of FIGS. 1 and 2.

As best seen in FIG. 3a, the dispenser 114 is formed as a substantially rectangular conduit having a U-shaped base member 118. The base member 118 includes a flat base portion 119, which is attached to bag wall 113, by heat-fusing or by a suitable adhesive. The side walls 115 and 117 of member 118 extend outwardly from flat portion 119. A flat cover member 126 is attached between the outer ends of walls 115 and 117 to enclose a substantially rectangular space 130. Again, any desired insecticides, repellents or vermin poisoning agents may be arranged at predetermined points within channel 130 in predetermined amounts to provide any desired distribution of this material within the bag 110.

Cover member 126 is attached to the ends of projecting end walls 115 and 117 by an adhesive which permits it to be torn away to open channel 130 as shown in FIG. 3. A pull tab 127 is attached to one end of cover member 126 to permit it to be pulled outwardly from the ends of walls 115 and 117, and thereby open channel 130. As in the case of the first embodiment, the dispenser 114 may be disposed about all or any desired portion of the inner surface of bag wall 113. The insecticide, repellents or vermin poisoning agents may as indicated above, by any suitable powder or liquid, some of which are set forth above.

Figure 4:
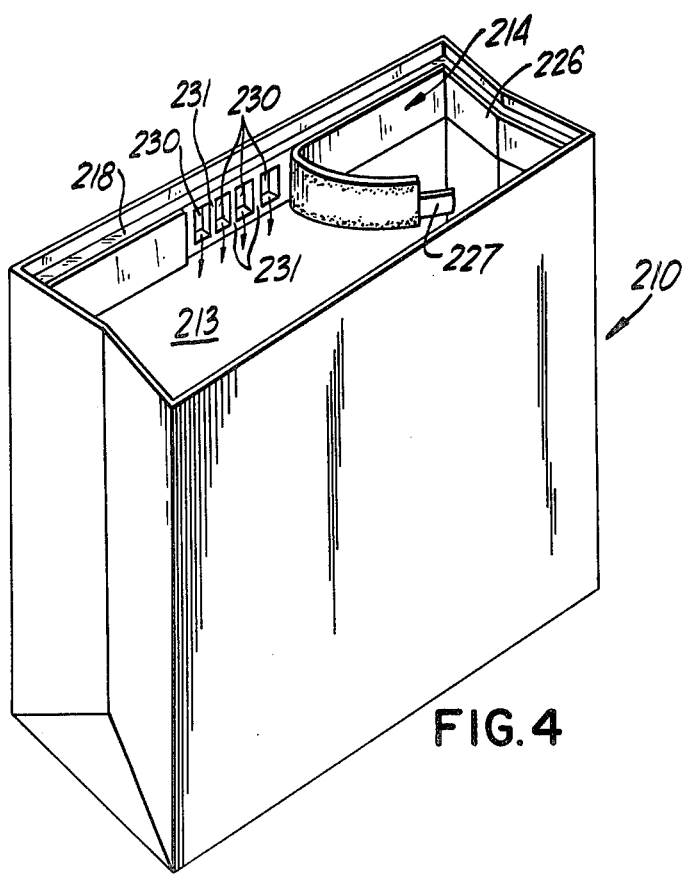
FIG. 4 is a prospective view of a container, including a third embodiment of the inventive dispensing device.

A third embodiment of the dispenser device is shown as 214 in FIG. 4. This embodiment is a variation of the embodiment shown in FIG. 3 and described above, but rather than a single continuous enclosed channel 130 of FIG. 3, this embodiment includes a plurality of recesses 230 extending into the base member 218 of the dispenser, with transverse walls 231 extending across the dispenser to define recesses 230. This embodiment facilitates any desired distribution of the insecticide, repellent or poisonous material over designated areas of the wall 213 of bag 210, since varying amounts of one material or several different materials can be stored in various ones of the recesses 230. This embodiment is especially advantageous when it is desirable to use several different materials which should not be mixed. As in the case of the embodiment described above, with respect to FIG. 3, a cover member 226 is affixed to base member 218 by a tearable adhesive which permits it to be pulled away as shown in FIG. 4. When in place, cover member 226 holds the material or materials within the recesses 230. When the cover member 226 is pulled free of base member 218 by grasping pull tab 227, the insecticide, repellent and/or vermin poisoning material is free to flow down the inner sides 213 of container 210. As described above, with regard to the other embodiments of the dispensing member 214, the base member 218 is attached to bag wall 213 by heat fusion or by a suitable adhesive.

Figure 5:
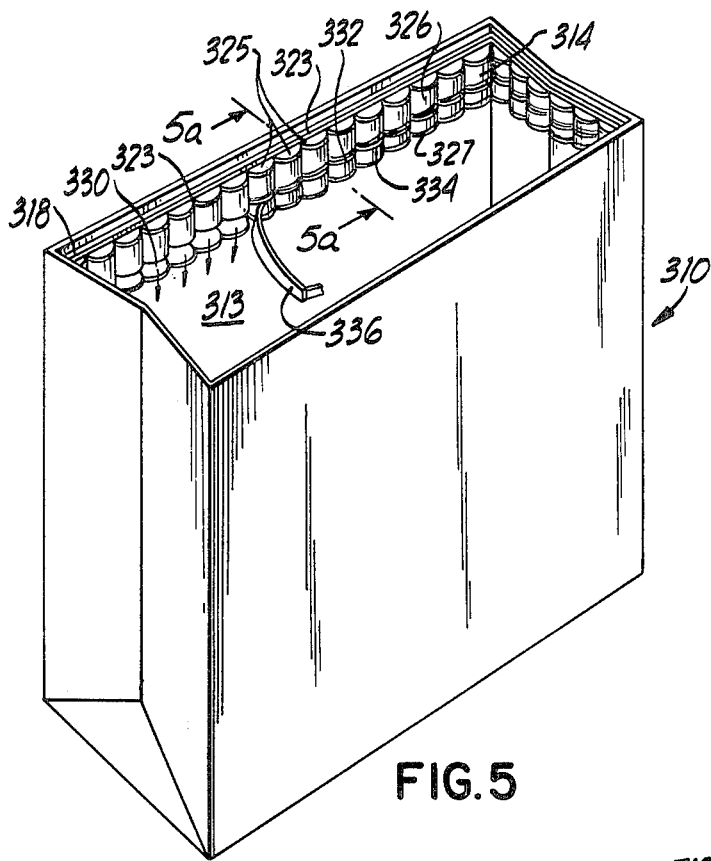
FIG. 5 is a prospective view of a fourth embodiment of the inventive dispensing device.
Figure 5A:
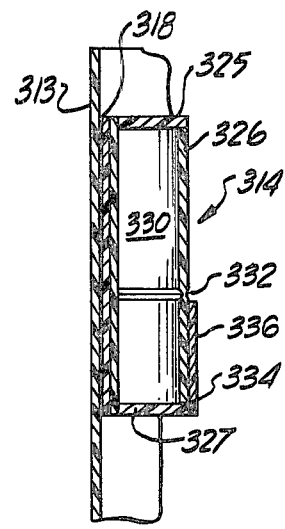

FIG. 5 shows a fourth embodiment of the dispensing device designated as 314. In this embodiment a number of separate receptacles 325 comprise the dispenser and are attached to a common backing plate 318 which is in turn, attached to the wall 313 of bag 310. The chambers 325 include a cover member 326 which can be formed of a continuous piece. As shown in FIG. 5a, cover member 326 is attached at predetermined points 323 to define a plurality of separated spaces 330 for the storage of insecticides, repellents or poison materials. End pieces 325 and 327 are attached respectively to each of the ends of cover member 326 to enclose each of the chambers 325. A tear strip 336 is arranged between perforated lines 332 and 334 so that each of the receptacles 325 may be ruptured in turn by the tear strip 336, selectively releasing the contents of some or all the chambers 325. Alternatively, individual chambers such as 325 can be provided by utilizing a continuous tube such as that shown in FIG. 1, and by sealing the cover member 26 to the backing plate 18 at predetermined longitudinal intervals. This embodiment again permits the placement of varying amounts or different types of insecticides, repellents and/or vermin poisons at predetermined points around the inner wall 313 of the bag, and the selective release of some or all of the substance or substances so placed.

Figure 6:
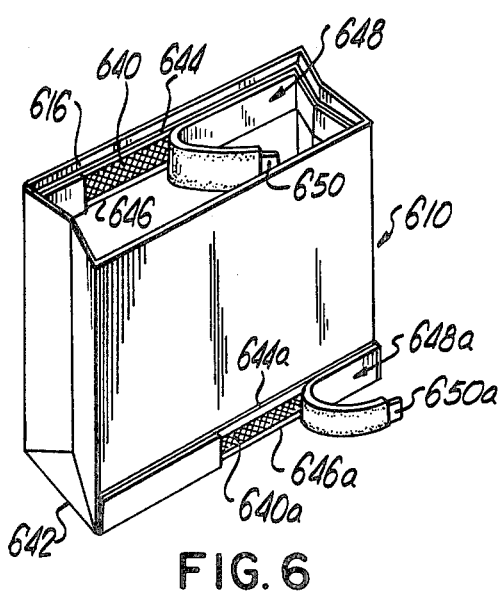
FIG. 6 is a prospective view of a fifth embodiment of the inventive dispensing device.
Figure 7:
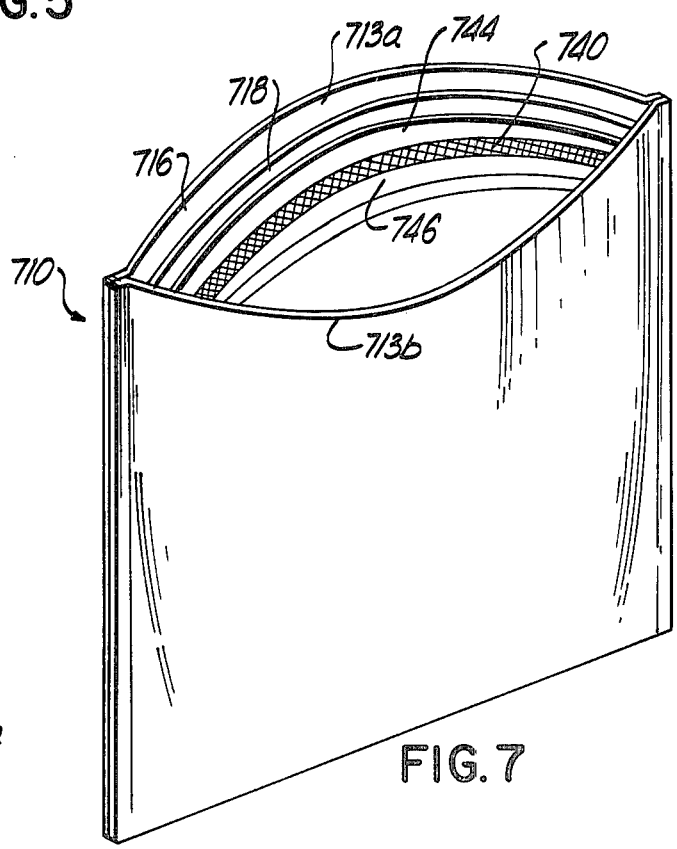
FIG. 7 is a prospective view of a sixth embodiment of the inventive dispensing device.

Further alternative embodiments of the invention are shown in FIGS. 6 and 7. In each of these embodiments the insecticide, repellent or poisonous substance is coated onto a surface of backing plates 618 and 718 in the form of a strip of the material 640 and 740 respectively. This backing plate can be mounted on any desired internal or external surface of the container. If desired, a strip of absorbent fibrous material may be substituted for the strip 640 if liquid insecticides, repellents or poisons are to be utilized. Alternatively, a roughened surface area may be substituted. As shown in FIG. 6, two advantageous places to arrange such a strip 640 are adjacent to the upper edge 616 of container 610 or adjacent to the bottom 642 of container 610.

As indicated in FIG. 6, the strip 640 of insecticide, repellent or poisonous material can be bounded by parallel strips 644 and 646 which are coated with tearable adhesive material. A removable cover strip 648 can be mounted over the strip 640 by attaching its lateral edges along adhesive strips 644 and 646. A tear tab 650 can be attached to an end of cover strip 648 so that by grasping this tab 650, the cover strip 648 can be removed exposing the strip 640 of insecticide, repellent and/or poisonous material. The lower strip, 640a of FIG. 6, is similarly bounded by tearable adhesive strips 644a and 646a and is covered by cover strip 648a.

In FIG. 7, a central strip 740 of insecticide, repellent or poisonous material is coated onto a portion of the surface of backing plate 718 which is mounted on container 710 preferably in the area adjacent to the upper bag opening 716. If desired, a strip of porous material or a roughened surface may be substituted for the coated strip 740 in this embodiment. The central strip 740 is bounded by tearable adhesive strips 744 and 746 and are also coated on backing plate 718. When the container 710 is sold, it is folded flat so that its opposed major surfaces 713a and 713b are in contact and opposed portions of the adhesive strips 744 and 746 adhere to each other enclosing the strip 740 and holding the container 710 closed. When one desires to use container 710, the opposed portions of the upper edge 716 are grasped and pulled apart, causing the opposed portions of tearable strip 744 and 746 to be separated, exposing the strip 740.

Each of the above-embodiments provide a safe means of dispensing insecticides, repellents and/or poisons over or adjacent to garbage or trash without the danger of such material contaminating food or other things in the immediate area and without volatile materials escaping to the room air. Since the possibly harmful substances are enclosed until use, they would not be accessible to children or household pets, which could be injured if permitted to contact such substances. In addition, the person dispensing these substances need not handle them in any way prior to or during use.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. A dispensing device for dispensing materials along a wall of a container including:
    at least one elongated member to hold said materials, said elongated member including a first elongated substantially U-shaped base member having a flat surface, said flat surface being attached along at least a portion of said wall, and arms extending outwardly from said flat surface to define a channel, each of said arms terminating in an outer end;
    a plurality of transverse cross members attached to said base member and extending between said arms to subdivide said channel into a plurality of separate compartments;
    a cover strip removably attached to the outer ends of said arms and said cross members to enclose said compartments; and
    a pull tab attached to said cover strip to permit said cover strip to be pulled away from the outer ends of said arms to expose at least one of said compartments.

2. A dispensing device as claimed in claim 1 in which a strip of a porous material is attached to said base member within at least one of said compartments.

3. A dispensing device for dispensing materials along a wall of a container including:

an elongated base member;

attachment means to attach said base member along said wall;

a cover member attached to said base member along a plurality of transverse areas longitudinally spaced along said base member, said cover member extending outwardly from said base member between said areas of attachment to form projections from said base member;

a top and a bottom closure attached respectively to the top and bottom of each of said projections to provide a plurality of receptacles; and means to rupture at least one of said receptacles.

4. A dispensing device as claimed in claim 3 in which said attachment means includes a backing strip having one side connected to said wall and the other side connected to said base member.

5. A dispensing device as claimed in claim 3 in which said means to rupture said receptacles includes a tear strip disposed beneath and extending longitudinally along said cover member.

6. A dispensing device as claimed in claim 3 in which a strip of a porous material is attached to said base member within at least one of said compartments.

* * * * *